United States Patent [19]
Osuna-Diaz

[11] Patent Number: 6,074,593
[45] Date of Patent: Jun. 13, 2000

[54] CORE PIN ARRANGEMENT AND METHOD FOR INJECTION MOLDING

[76] Inventor: Jesus'M. Osuna-Diaz, 908 Ravine Ter. Ct., Rochester Hills, Mich. 48307

[21] Appl. No.: 09/042,412

[22] Filed: Mar. 13, 1998

[51] Int. Cl.⁷ ................................................ B29C 45/23
[52] U.S. Cl. .................................. 264/328.1; 264/328.9; 425/564; 425/810
[58] Field of Search ......................... 425/562, 563, 425/564, 565, 566, 810, 577; 264/106, 107, 161, 328.1, 328.9, 155, 328.7, 336, 154

[56] References Cited

U.S. PATENT DOCUMENTS

| | | | |
|---|---|---|---|
| 2,613,395 | 10/1952 | Massler | 264/328.9 |
| 4,394,117 | 7/1983 | Taylor | 425/563 |
| 4,405,540 | 9/1983 | Mayer | 264/106 |
| 5,068,065 | 11/1991 | Maus et al. | 264/106 |
| 5,324,190 | 6/1994 | Frei | 264/107 |
| 5,460,763 | 10/1995 | Asai | 264/328.9 |
| 5,545,365 | 8/1996 | Asai | 264/106 |
| 5,785,915 | 7/1998 | Osuna-Diaz | 264/328.9 |

*Primary Examiner*—Jill L. Heitbrink
*Attorney, Agent, or Firm*—John R. Benefiel

[57] ABSTRACT

An arrangement and method for mounting a core pin for an injection molding a part, includes mounting a core pin in a cavity plate to extend upwardly through the cavity and into an opening in one end of a valve sleeve operated to control melt injection through a gate in a heated injection nozzle. The core pin moves away from the injection nozzle when the cavity plate is separated to remove the part.

5 Claims, 2 Drawing Sheets

CORE PIN ARRANGEMENT AND METHOD FOR INJECTION MOLDING

BACKGROUND OF THE INVENTION

This invention concerns injection molding and more particularly the valving used to control the flow of melted plastic into a mold cavity.

Injection molding of plastic involves forcing hot melted plastic into a mold cavity through a gate in an injection nozzle, and thereafter closing the gate in the injector nozzle to stop the flow of melt and allow separation of the mold plates and removal of the molded part. The gate is typically opened and closed by movement of a valve pin on and off a valve seat defining the gate. The pin is operated with an actuator such as shown in U.S. Pat. Nos. 5,670,190 and 5,067,893 to the present inventor.

In a variation of the arrangement of moving a valve pin on and off a valve seat, the pin can be formed with a reduced diameter section intermediate a full diameter end which enters into an opening in the mold plate. The hot melt is injected through the annular space formed by the reduced diameter section when the gate is open and into the mold cavity. The pin is retracted to bring the full diameter end into the gate and close off further flow of the melt.

This arrangement is sometimes referred to as "core ring" gating, as an annular space is defined around the pin when the gate is opened. This design is used for molded parts having a center hole, formed by the end of the valve pin, as the center hole is formed when the part is molded.

This arrangement is shown in Japanese published application no. 55061438 and also in U.S. Pat. No. 4,521,179.

This arrangement creates problems as the pin is mounted within the heated nozzle, and thus the pin end tends to be hotter than the mold plate in which cavity is formed. This in turn tends to cause the injected plastic adjacent the pin to remain molten for too long.

Heretofore, exotic pin and nozzle constructions have been employed in an attempt to prevent the hot pin end from interfering with the proper formation of the part.

It is the object of the present invention to provide a core ring pin gating arrangement which does not create the overheating problem described.

SUMMARY OF THE INVENTION

The above recited object is achieved by providing a separate core pin mounted in the cavity plate to project towards the injection nozzle. A valve sleeve is mounted for retracting and advancing movement of a tapered end on and off a tapered valve seat. The core pin is received into an aligned bore in the valve sleeve until the mold plates are separated, which withdraws the core pin completely from the valve sleeve end. This arrangement reduces the exposure of the core pin to the heat of the nozzle such that it will not become heated excessively and interfere with the molding process.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
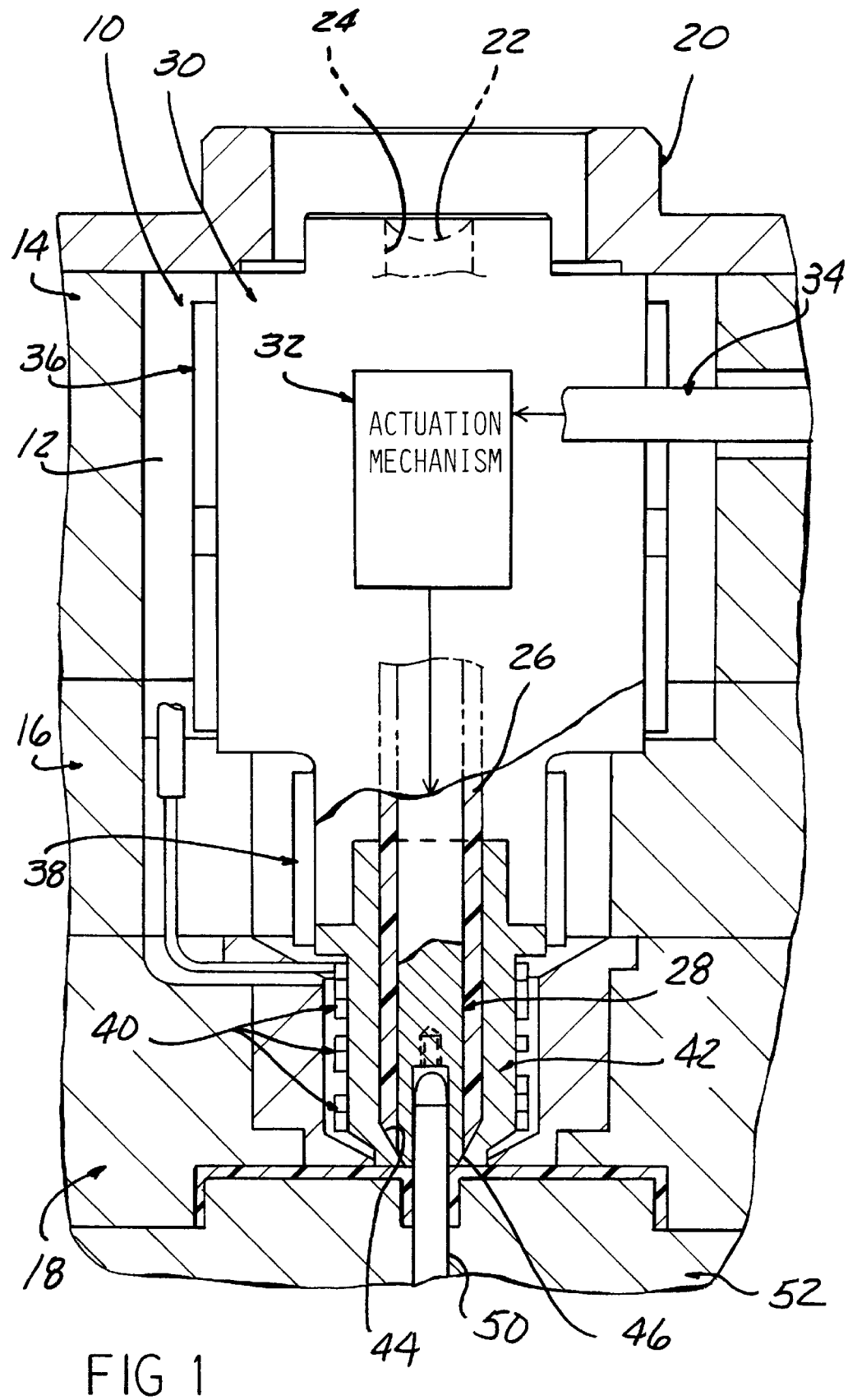
FIG. 1 is a partially sectional view of an injection nozzle, and fragmentary sectional view of adjacent portions of the mold plates, showing the core pin according to the gating arrangement of the present invention, the gate shown in the closed condition.

Referring to the drawings, and particularly FIG. 1, an injection nozzle 10 is shown received in space 12 defined in a series of mold plates 14, 16, 18 secured together in the well-known manner. The injection nozzle 10 is secured in position with a cap plate 20.

An injector (not shown) is adapted to engage a seat 22 on the upper end of the injection nozzle 10 and force a quantity of hot melt into the interior passage 24 of the injector nozzle body 30.

The passage 24 communicates with an annular supply passage 26 defined around a valve element comprised of a valve sleeve 28 extending upwardly within the injector nozzle body 30.

The injector valve sleeve 28 is adapted to be drawn up and down by an actuation mechanism 32, shown in block diagram form.

This mechanism preferably comprises the double pinion gear mechanism shown in U.S. Pat. No. 5,670,190 issued to the present inventor on Sep. 23, 1997, which includes a pair of shafts 34 oscillated by a hydraulical cylinder as described in detail in that patent.

A series of surrounding electrical heater coils 36, 38, and 40 are typically provided to maintain proper melt temperature in the well-known manner.

The injector nozzle body 30 has a gate sleeve 42 mounted at its lower end, defining an internal tapered gate seat 44 concentric with the valve sleeve 28, which has a conical valve face 46 on its lower end.

These two surfaces are adapted to be in mating relationship when the valve sleeve 28 is moved to its advanced, or gate closed position by the actuation mechanism 32.

Figure 2:
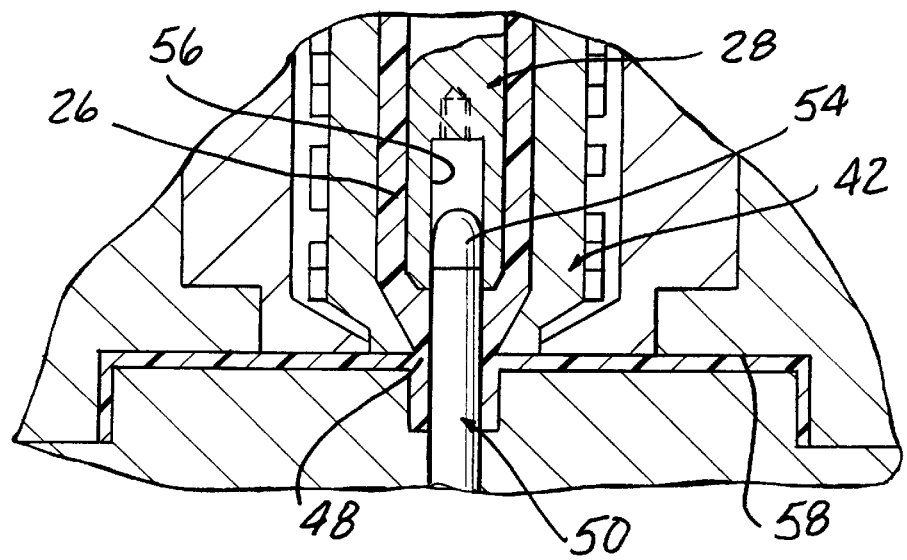
FIG. 2 is an enlarged sectional view of the injection nozzle, mold plates and core pin, with the gate shown in the open condition.

With the valve sleeve 28 retracted (FIG. 2), an annular gate 48 is defined between the seat 44 and the exterior of an upwardly projecting core pin 50 carried in mold cavity plate 52.

The core pin 50 has a rounded end 54 received in counterbore 56 extending axially into the end of the valve sleeve 28. The counterbore 56 is of a sufficient length so as to accommodate the core pin 50 as the valve sleeve 28 is advanced to close off the gate 48, as seen in FIG. 1.

A mold cavity 58 is defined between the mold plate 18 and cavity plate 52.

Figure 3:
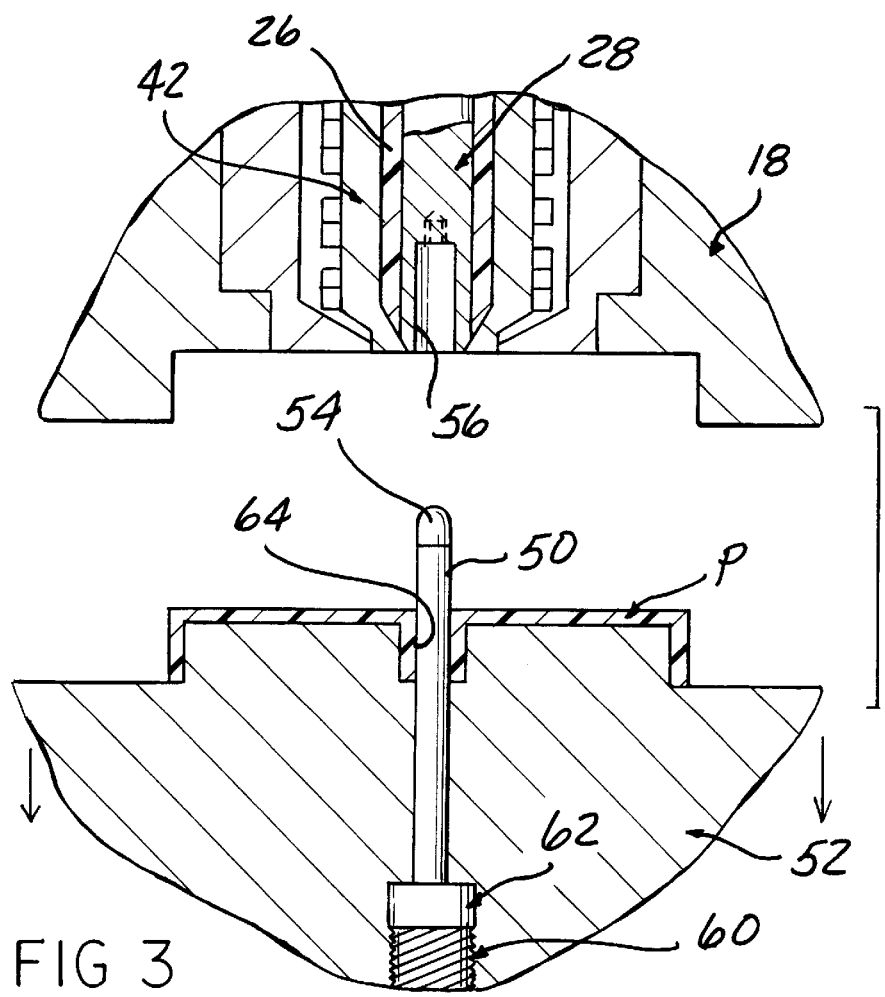
FIG. 3 is a partially sectional view of portions of the injection nozzle, mold plates, and core pin of FIG. 1 with the mold plates separated preparatory to removal of the part.

When plates 52 and 18 are separated as shown in FIG. 3, the core pin 50 is completely removed from the counterbore 56, and the part P can be removed.

The core pin 50 can be held in the cavity plate 52 with a threaded plug 60 engaging a head 62 on the lower end thereof as shown in FIG. 3.

The core pin 50 is much less subject to conductive heat transfer from the heated nozzle 10 as compared to the prior art valve pin as it is cooled by being received in the cavity plate 52, and being separated completely from the nozzle 10 when the mold plates are separated.

Accordingly, the part P can be formed with an open bore 6 at the time of molding without the complications heretofore encountered.

What is claimed is:

1. A method of injection molding a part in an injection molding apparatus including a mold cavity defined by separable mold and cavity plates, a gate into said mold cavity defined in said mold plate, and an injection nozzle in said mold plate having a valve element axially advanced in a direction towards said cavity plates by an actuation mechanism to mate one end of said valve element with a valve seat extending about said gate and to be axially retracted in a direction away from said cavity plate to be unseated from said valve seat for controllably directing melt through said gate and into said mold cavity, said method including the steps of:

mounting a core pin to said cavity plate so as to project towards said valve element through both said mold cavity and said gate;

slidably mating said core pin with said one end of said valve element so as to maintain said core pin mated therewith as said valve element is advanced to be mated with said valve sent and retracted to be moved off said valve sent and opened for injection molding of said part, said core pin extending through said mold cavity to partially define said cavity throughout said movement of said valve element, said core pin thereby creating a hole in said part; and allowing complete withdrawal of said core pin from said valve element when said mold and cavity plates are separated to remove a part.

2. An injection molding gating arrangement for controlling the flow of hot melt into a mold cavity defined by separable mold and cavity plates, said arrangement including:

an injection nozzle for receiving injected melt and directing said melt through an internal passage in an injection nozzle body;

an elongated valve element disposed in said valve nozzle body;

actuation means for axially moving said valve toward said cavity plate from between a retracted position on said valve nozzle body to an advanced position extending in a direction towards said cavity plate and from said advanced position back to said retracted position;

a valve seat defined in said valve nozzle body concentrically arranged about one end of said valve element;

said valve seat defining a melt flow gate allow injection of melted plastic into said mold cavity when said valve element is in said refracted position, said gate thereby placed in communication with said passage;

said valve element one end and valve seat configured to fit together with said valve element in said advanced position to close said gate; and, a core pin extending from said cavity plate in a direction toward said valve element one end and through both said mold cavity and said gate, said valve element one end mated with one end of said core pin when said cavity and mold plates are brought together, said core pin slidable mating engagement extending a sufficient distance to accommodate said axial movement of said valve element with said core pin received therein, said core pin completely removed from said mating engagement when said mold plates are separated, said core pin extending through said mold cavity during said valve element movement to thereby shaping said injected plastic to create a hole in said part.

3. The gating arrangement according to claim 2 wherein said valve element comprises a valve sleeve open at said one end to receive said core pin end.

4. The gating arrangement according to claim 3 wherein said valve seat comprises a conical shape and said valve sleeve one end has a mating tapered shape.

5. The gating arrangement according to claim 2 wherein said injection nozzle includes a heater.

* * * * *

UNITED STATES PATENT AND TRADEMARK OFFICE
CERTIFICATE OF CORRECTION

PATENT NO. : 6,074,593
DATED : June 13, 2000
INVENTOR(S) : Jesus' M. Osuna-Diaz

It is certified that error appears in the above-indentified patent and that said Letters Patent is hereby corrected as shown below:

Column 3, line 4, delete "6", insert therefor --64--.

Column 3, line 25, delete "sent", insert therefor --seat--.

Column 3, line 26, delete "sent", insert therefor --seat--.

Column 4, line 22, after "end", insert --slidably--.

Signed and Sealed this

Eighth Day of May, 2001

*Attest:*

NICHOLAS P. GODICI

*Attesting Officer*    *Acting Director of the United States Patent and Trademark Office*